Re. 24528

July 5, 1955

H. C. BORISCH 2,712,345

SEAT BACK LOWERING MECHANISM

Filed Sept. 26, 1952

INVENTOR.
HENRY C. BORISCH
BY
Carl J. Barbee

United States Patent Office 2,712,345
Patented July 5, 1955

2,712,345

SEAT BACK LOWERING MECHANISM

Henry C. Borisch, Detroit, Mich., assignor to American Motors Corporation, a corporation of Maryland Application September 26, 1952, Serial No. 311,709

9 Claims. (Cl. 155—7)

This invention relates to improvements in automobile seats and the principal object of the invention is to provide a front seat construction for automobiles whereby said seat may be readily adjusted to a plurality of intermediate reclining positions.

I am aware that the convertible seat arrangement for automobiles is not broadly new. Under the circumstances it will be manifest that it is my chief aim to generally improve upon prior structuers of the general type by providing an arrangement characterized by appreciable refinements and structural improvements especially adapted to serve their proportionate share in the development of an ingenious and dependable accommodation for the occupants of the automobile when desiring certain reclining conveniences.

One of the features of the present invention is its adaptability to automobiles in which the seat backs are divided and constructed with hinged backs so that they may be individually controlled to tilt forwardly for access to the rear of the automobile, or to be released from their normal supporting position to adjusted reclining positions.

The present invention is also characterized by a set of brackets having spaced notches which are intermittently engaged by a pawl associated with and forming an integral part thereof of a longitudinally extending shaft in turn actuated by a lever suitably disposed for ready manipulation by an occupant of either of said divided seats. The cooperation of said brackets and said pawl positively assure the desired position of the respective seats and lock said seats against displacement.

A further object of the invention is to provide spaced brackets provided with notches formed similarly in each bracket and a floating plate having a notched segment arranged adjacent one of said brackets together with an operating shaft and latch rods whereby automatic lowering of the seat back is affected one notch at a time by manual manipulation of a hand lever arranged on one end of said shaft and one end of one of said rods so that the end of the other rod intermittently engages the notches in the bracket and the notches in the floating plate.

A still further object of the invention is to provide a front seat construction and arrangement which is of relatively simple construction, inexpensive to manufacture and install, and thoroughly efficient and reliable in operation and otherwise well adapted for the purpose for which it is designed.

The invention possesses other objects and features of advantage, some of which with the foregoing, will be set forth in the following description of the preferred form of the invention which is illustrated in the drawings accompanying and forming part of the specification. It is to be understood, however, that variations in the showing made by the said drawings and description may be adapted within the scope of the invention as set forth in the claims.

Referring to the drawings.

Figures 1, 2:
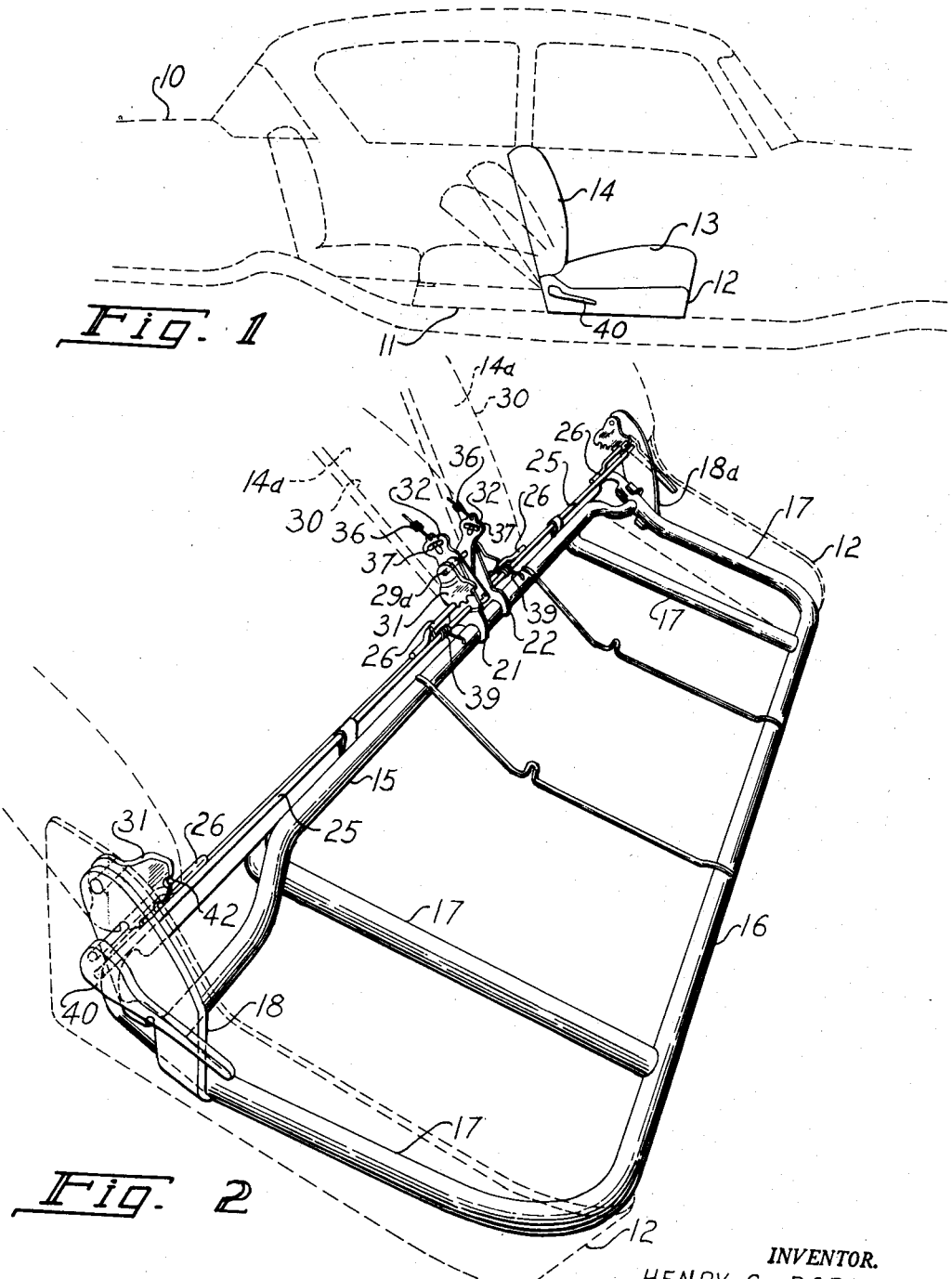
Figure 1 is a diagrammatic elevational view of an automobile body employing the present invention.
Figure 2 is a perspective view showing the arrangement of my invention with respect to a full double front seat structure.

Referring now in detail to the drawings, a vehicle body is indicated generally at 10 in Figure 1. Within the vehicle body there is provided a floor board 11 mounting the seat frame 12 upon which is mounted the seat cushion 13 and to which is secured the tilting seat back 14.

Figure 3:
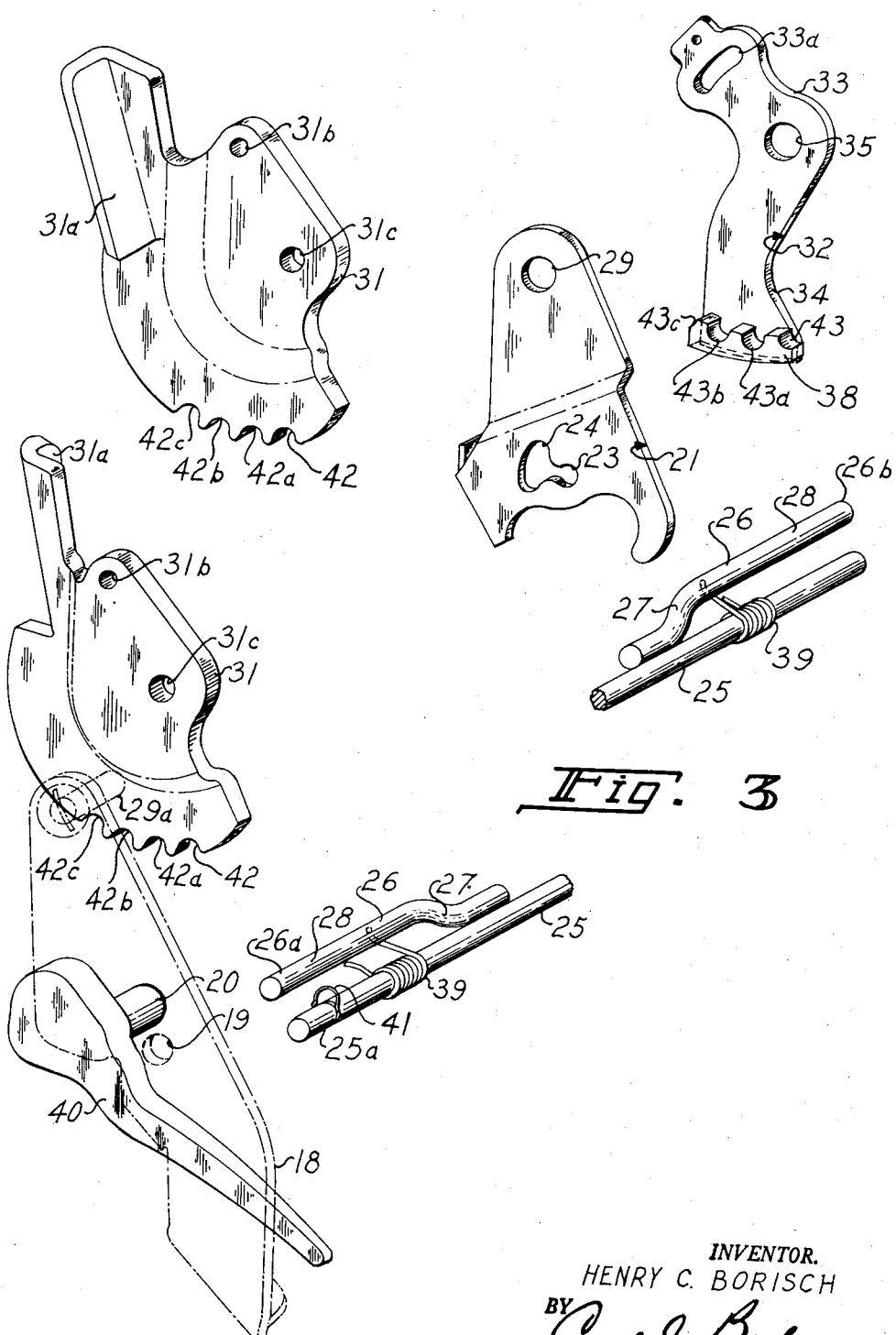
Figure 3 is a detailed perspective view illustrating in disassembled or exploded position certain of the parts illustrated in Figure 2.

Considering now the construction shown in Figures 2 and 3, inclusive, the seat frame 12 includes transversely extending tubular bars 15 and 16 which are fastened together by cross members 17. Mounted upon each end of seat frame 12 and adjacent the end cross members 17 are vertical extending pillars or brackets 18 and 18a. Each bracket is provided with a pair of communicating apertures, one of lesser diameter designated by the numeral 19 and one of greater area which is arcuately shaped and designated by numeral 20.

A pair of spaced relatively wide reinforcing plates 21 and 22 are anchored to the longitudinally extending bar 15 approximately midway between the end cross members 17. These plates project vertically away from bar 15 and are provided with apertures 23 and 24 of approximately the same size and shape as apertures 19 and 20 of bracket 18. These apertures 19, 20, 23 and 24, respectively, are so arranged in operative position whereby aperture 19 is in direct line with aperture 23, and aperture 20 is in direct line with aperture 24.

A longitudinally extending operating shaft 25 is mounted between each pair of brackets 18 and 21, and 18a and 22, with the free ends of said shaft projecting into and through aligned apertures 19 and 23. Attention is directed to the fact that the end of the shaft adjacent aperture 23 terminates immediately beyond said apertures 23 while the other end of said shaft projects a substantial distance beyond the aperture 19. The explanation for this particular arrangement will be given later as this description progresses.

Latch rods 26, of which there are ordinarily four used in the particular installation in the vehicle of the instant description, are arranged so one rod is mounted adjacent each end of shaft 25. One end of the rod is secured to the shaft and then bent at an angle away from said shaft, as indicated by numeral 27, with the free end 28 of said rod arranged parallel with said operating shaft. Attention is directed to one of said rods 26, more specifically characterized by the numeral 26a which projects through aperture 20. The free end of this rod terminates approximately in line with the free end of shaft 25a projecting through aperture 19.

Attention is also directed to another of said rods 26, characterized by the numeral 26b. This rod projects through aperture 24 of bracket 21 and instead of terminating in line with the end of operating shaft 25 projecting through aperture 23, extends forwardly a short distance, the purpose of which will be elaborated on as this description progresses.

Each of the brackets 18 and 21 and 22 are provided with an enlarged opening 29 at the upper end adapted to receive a hinge pin 29a, one each of which is anchored in each end wall 30 of the seat backs 14 and upon which the seat backs are hingedly mounted.

Each of the end walls 30 of the seat backs 14 is provided with an arcuately shaped toothed or notched segment 31. The base of each segment which is provided with a seat back engaging flange 31a is firmly anchored adjacent the base of each end wall by suitable fastening elements at 31b and 31c with the notched portion parallel with and extending at an angle downwardly and away from the end wall of seat back 14. The notches are spaced and in operative position intermittently engaging a portion of said latch rods. The disposition of the segments 31 at both ends of the seat back with the latch rods arranged to engage the notches of the segments, provide adequate support for the seat back when said seat is occupied and the occupant leans against said seat back.

Attention is directed to the inside end walls of seat backs 14, one end wall of which is designated by the numeral 14a. Rotatably mounted on the hinge pin 29a secured to the end wall 14a and adjacent thereto is a substantially flat faced link member 32. In the instant disclosure, two separate seat backs are shown; therefore, one of said links 32 will be mounted on each inside end wall 14a with the flat side of each link arranged parallel with its respective end wall 14a. The link comprises two integral sections, one of which is designated as the upper section 33 and the other, the lower section 34 separated by the opening 35 which receives the hinge pin 29a. The free end of upper section 33 provides space for mounting one end of a coil spring 36, the other end of said spring secured in the end wall 14a of its respective seat back 14. Between the free end of section 33 and the opening 35, an enlarged slot 33a is formed or cut through the flat side of upper section 33. This slot is of substantial length and sufficient width to receive a pin 37 anchored in the end walls 14a whereby the bracket or link member 32 is free to swing rotatively about the pivot pin 29a within the limits permitted by the elongated slot 33a. The lower section 34 projects downwardly and parallel to the plate 21. The other link member 32 would be arranged parallel to the other plate 22. The width of the free end of lower section 34 is of sufficient proportions to readily accommodate a toothed or notched segment 38 which is welded or otherwise secured to the inside flat surface of the lower section 34 and parallel and facing the toothed portion of the notched segment 31. The peculiar arrangement of the link member 32 with respect to the spring 36 and slot 33a is such that the link 32 may have so-called floating characteristics. That is, the member 32 alignes the notches in segments 31 and 32 during movement of latch rod from segment 31 to segment 32 to permit automatic lowering of the seat back one notch at a time.

As shown in Figures 2 and 3 a torsion spring 39 is wound around each end of operating shaft 25 with one end of said spring wound around the adjacent latch rod and the other end of said spring bearing on the extending tubular bar 15.

Each end of seat frame 12 is perforated to provide openings in line with apertures 19 and 20 in bracket 18. The free ends of the operating shaft and latch rod extend through the seat perforations and are secured in one end of arc operating lever 40. The torsion spring 39 continuously urges the operating shaft 25 rotatively in one direction to return the latch rods to notch engaging position in segments 31 when manual pressure on handle 40 is released after manual pressure on handle is released, gravity forces the seat back to drop backwardly and torsion spring 39 causes latch rod 26 to move up into the succeeding notch in the segment 31.

A collar 41 is arranged on operating shaft 25 between bracket 18 and coil spring 39 and, in operative position, is in contact with bracket 18. This collar ordinarily is secured to operating rod by a cotter pin which passes through an aperture provided in said collar and an aligned aperture provided through said operating rod. The particular function of this collar is to prevent outward longitudinal movement of the operating shaft and latch rod.

Attention is directed to the actual operating ends of operating shaft 25 and latch rod 26. It will be noted that the free end of the operating shaft terminates and is rotatably mounted in aperture 23 of bracket 21 while the free end of latch rod 26 passes through the aperture 24 of bracket 21 sufficiently to be aligned with the notches in segment 38 of the link member 32.

In normal seating position the latch rod rests within the first notch 42 of each of the segments 31.

Referring to Figure 2, it will be noted that the positioning of latch rods 26 in the arcuately shaped apertures 20 is such that as lever 40 is pushed downwardly, the latch rod will move in said aperture 20 downwardly and away from containing notch 42 of segment 31 and into notch 43 of the segment 38 of the link member 32.

As the release from notch 42 to notch 43 is gradually downward, the seat back must accordingly move a distance calculated from the distance occasioned by release of latch rod in notch 42 to 43.

Referring to Figure 2, it will be noted that the segment includes four notches designated by the numerals 42, 42a, 42b and 42c. It will also be noted that the segment 38 is provided with notches 43, 43a, 43b and 43c. In actual operation, therefore, the seat back, with the arrangement as disclosed, could be adjusted and locked in four predetermined positions. When the latch rod is disengaged fully from notch 42c there is a continued backward swinging movement of the seat back 14 downwardly and uninterruptedly to a complete reclining or bed position. When the latch rod is disengaged from notch 42 when the seat back is being tilted forwardly from the reclining or bed position, such forward tilting may be freely carried out uninterruptedly to a forward position.

It is thought that the construction, manipulation, utility, and advantages of this invention will now be apparent to those skilled in this art without a more detailed description thereof.

The present embodiment of the invention has been described in considerable detail merely for the purposes of exemplification since in actual practice it attains the features of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim is:

1. In combination, a seat frame, a seat back, two segments secured to said seat back, one adjacent each end thereof, said segments having a plurality of notches therein, a stationary support adjacent each segment mounted on said frame, a pair of hinge pins secured to said seat back, one adjacent each end thereof, said pins engaged with said supports, a link, said link pivotally mounted on one of said pins and arranged adjacent the opposite side of one of said supports, said link provided with a segment having a plurality of notches therein, an operating shaft, a pair of latch rods mounted on said operating shaft, one adjacent each end thereof, said shaft and rods being engaged with said supports, one of said rods arranged to intermittently engage one or the other of said first mentioned notches and said second mentioned notches.

2. In combination, a seat frame, a seat back, two segments secured to said seat back, one adjacent each end thereof, said segments having a plurality of notches therein, a stationary support adjacent each segment mounted on said frame, said supports arranged in spaced relation to one another and having aligned apertures, a pair of hinge pins secured to said seat back, one adjacent each end thereof, said pins engaged with said supports, a link, said link pivotally mounted on one of said pins and arranged adjacent the opposite side of one of said supports, said link provided with a segment having a plurality of notches therein, an operating shaft, a pair of latch rods mounted on said operating shaft, one adjacent each end thereof, said shaft and rods being engaged in said apertures, one of said rods arranged to intermittently engage one or the other of said first mentioned notches and said second mentioned notches.

3. In combination, a seat frame, a seat back, two segments secured to said seat back, one adjacent each end thereof, said segments having a plurality of notches therein, a stationary support adjacent each segment mounted on said frame, said supports arranged in spaced relation to one another, each support being provided with a pair of openings, one of said openings in said pair in each support being arcuately shaped, each pair of said openings in said opposed supports aligned with each other, a pair of hinged pins secured to said seat back, one adjacent each end thereof, said pins engaged with said supports, a link, said link pivotally mounted on one of said pins and arranged adjacent the opposite side of one of said supports, said link provided with a segment having a plurality of notches therein, an operating shaft, a pair of latch rods mounted on said operating shaft, one adjacent each end thereof, said shaft being engaged with one pair of aligned openings, each of said rods being engaged with the adjacent arcuately shaped opening, one of said rods arranged to intermittently engage one or the other of said first mentioned notches and said second mentioned notches.

4. In combination, a seat frame, a seat back, two segments secured to said seat back, one adjacent each end thereof, said segments having a plurality of notches therein, a stationary support adjacent each segment mounted on said frame, a pair of hinge pins secured to said seat backs, one adjacent each end thereof, said pins engaged with said supports, a link, said link pivotally mounted on one of said pins and arranged adjacent the opposite side of one of said supports, a guide pin, said guide pin secured in said seat back adjacent said link, said link provided with a slot, said guide pin arranged to project into said slot, a coil spring, one end of said spring secured to said seat back, the other end of said spring mounted on one end of said link, said link provided with a segment at its other end having a plurality of notches therein, an operating shaft, a pair of latch rods mounted on said operating shaft, one adjacent each end thereof, said shaft and rods being engaged with said supports, one of said rods arranged to intermittently engage one or the other of said first mentioned notches and said second mentioned notches.

5. In combination, a seat frame, a seat back, two segments secured to said seat back, one adjacent each end thereof, said segments having a plurality of notches therein, a stationary support adjacent each segment mounted on said frame, a pair of hinge pins secured to said seat back, one adjacent each end thereof, said pins engaged with said supports, a link, said link pivotally mounted on one of said pins and arranged adjacent the opposite side of one of said supports, said link provided with a segment having a plurality of notches therein, an operating shaft, a pair of latch rods mounted on said operating shaft, one adjacent each end thereof, said shaft and rods being engaged with said support, one end of said shaft and one of said rods extending through the adjacent support the same distance, the other end of said shaft ending just beyond said other support with said other rod projecting a substantial distance beyond the other support, said first mentioned shaft end and rod providing support for a lever, said last mentioned rod arranged to intermittently engage a notch of the first mentioned segments and a notch of said link segment as said lever is manually operated.

6. In combination, a seat frame, a seat back, two segments secured to said seat back, one adjacent each end thereof, said segments having a plurality of notches therein, a stationary support adjacent each segment mounted on said frame, a pair of hinged pins secured to said seat back, one adjacent each end thereof, said pins engaged with said supports, a link, said link pivotally mounted on one of said pins and arranged adjacent the opposite side of one of said supports, a guide pin, said guide pin secured in said seat back adjacent said link, said link provided with a slot, said guide pin arranged to project into said slot, a coil spring, one each of said springs mounted on one end of said link, the other end secured to said seat back, said link provided with a segment at its other end having a plurality of notches therein, an operating shaft, a pair of latch rods mounted on said operating shaft, one adjacent each end thereof, said shaft and rods being engaged with said support, one end of said shaft and one of said rods extending through the adjacent support the same distance, the other end of said shaft ending just beyond said other support with said other rod projecting a substantial distance beyond the other support, said first mentioned shaft end and rod providing support for a lever, said last mentioned rod arranged to intermittently engage a notch of the first mentioned segments and a notch of said link segment as said lever is manually operated.

7. In combination, a seat frame, a seat back, two segments secured to said seat back, one adjacent each end thereof, said segments having a plurality of notches therein, a stationary support adjacent each segment mounted on said frame, said supports arranged in spaced relation to one another and having aligned apertures, an operating shaft, a pair of latch rods mounted on said operating shaft, one adjacent each end thereof, said shaft and rods being engaged with said apertures, one end of said shaft and one of said rods extending through the adjacent support the same distance, the other end of said shaft ending just beyond said other support with said other rod projecting a substantial distance beyond the other support, said first mentioned shaft end and rod providing support for a lever, a pair of hinge pins secured to said seat back, one adjacent each end thereof, said pins engaged with said supports, a link, said link pivotally mounted on one of said pins and arranged adjacent the opposite side of one of said supports, a guide pin, said guide pin secured in said seat back adjacent said link, said link provided with a slot, said guide pin arranged to project into said slot, a coil spring, one end of said spring mounted on one end of said link, the other end of said spring secured to said seat back, said link provided with a segment at its other end having a plurality of notches therein, said last mentioned rod arranged to intermittently engage a notch of the first mentioned segments and a notch of said link segment as said lever is manually operated.

8. In combination, a seat frame, a seat back, two segments secured to said seat back, one adjacent each end thereof, said segments having a plurality of notches therein, a stationary support adjacent each segment mounted on said frame, said supports arranged in spaced relation to one another, each support being provided with a pair of communicating openings, one of said openings in said pair in each support being arcuately shaped, each pair of said openings in said opposed supports aligned with each other, an operating shaft, a pair of latch rods mounted on said operating shaft, one adjacent each end thereof, said shaft and rods being engaged with said openings, one end of said shaft and one of said rods extending through the adjacent support the same distance, the other end of said shaft ending just beyond said other support with said other rod projecting a substantial distance beyond the other support, said first mentioned shaft end and rod providing support for a lever, a pair of hinged pins secured to said seat back, one adjacent each end thereof, said pins engaged with said supports, a link, said link pivotally mounted on one of said pins and arranged adjacent the opposite side of one of said supports, a guide pin, said guide pin secured in said seat back adjacent said link, said link provided with a slot, said guide pin arranged to project into said slot, a coil spring, one end of said springs mounted on one end of said link, the other end of said spring secured to said seat back, said link provided with a segment at its other end having a plurality of notches therein, whereby manual operation of said lever causes said rods to move in said arcuate openings and to cause said last mentioned rod to intermittently engage a notch of the first mentioned segments and a notch of said link segment.

9. In combination, a seat frame, a seat back, two segments secured to said seat back, one adjacent each end thereof, said segments having a plurality of notches therein, a stationary support adjacent each segment mounted on said frame, a pair of hinged pins secured to said seat back, one adjacent each end thereof, said pins engaged with said supports, a link, said link pivotally mounted on one of said pins and arranged adjacent the opposite side of one of said supports, said link provided with a segment having a plurality of notches therein, an operating shaft, a pair of latch rods mounted on said shaft, one adjacent each end thereof, said shaft and rods being engaged with said supports, a hand lever mounted on one end of said shaft and one of said rods, spaced coil springs arranged on said operating shaft, one free end of each spring wound around one of said rods, the other free end of said spring bearing on said frame, whereby said rods and shaft may be held under spring tension, one of said rods arranged to intermittently engage one or the other of said first mentioned notches and said second mentioned notches to cause automatic lowering of said seat back one notch at a time by manual manipulation of said hand lever.

References Cited in the file of this patent

UNITED STATES PATENTS

| 412,617 | Hogan | Oct. 8, 1889 |
| 2,336,013 | Hamilton | Dec. 7, 1943 |

FOREIGN PATENTS

| 12,564 | Great Britain | May 24, 1911 |